(No Model.)

H. C. DAVIS.
REIN HOLDER.

No. 498,107. Patented May 23, 1893.

WITNESSES:
W. M. Twitchell.
C. Sedgwick.

INVENTOR
H. C. Davis
BY Munn & Co
ATTORNEYS.

UNITED STATES PATENT OFFICE.

HOMER C. DAVIS, OF NORMALVILLE, PENNSYLVANIA.

REIN-HOLDER.

SPECIFICATION forming part of Letters Patent No. 498,107, dated May 23, 1893.

Application filed March 17, 1893. Serial No. 466,453. (No model.)

*To all whom it may concern:*

Be it known that I, HOMER C. DAVIS, of Normalville, in the county of Fayette and State of Pennsylvania, have invented a new and useful Improvement in Rein-Holders, of which the following is a full, clear, and exact description.

This invention relates to that description of rein holders for carriages and other vehicles, designed to be attached to the dash-board of the vehicle, and which comprises an upper presser bar operated on by a spring to hold the reins in between it and a lower bar or frame, by laterally introducing the right and left hand reins in between said clamping devices from opposite ends of the latter, and the invention consists in a rein holder of this description, of novel construction, substantially as hereinafter described and more particularly pointed out in the claims.

Reference is to be had to the accompanying drawings forming a part of this specification, in which similar letters of reference indicate corresponding parts in all the views.

Figure 1:
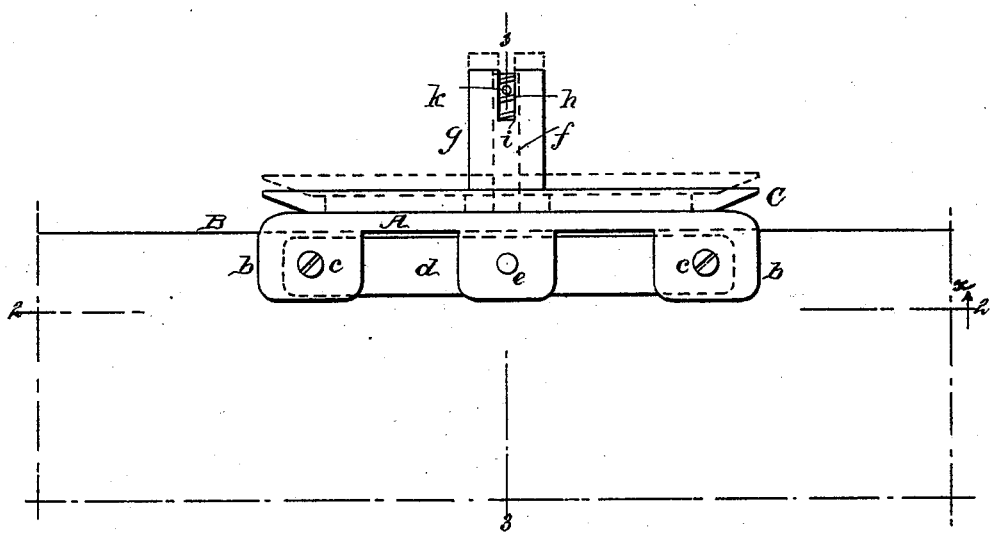
Figure 2:
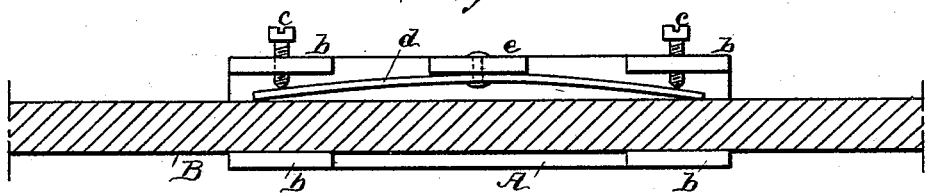
Figure 3:
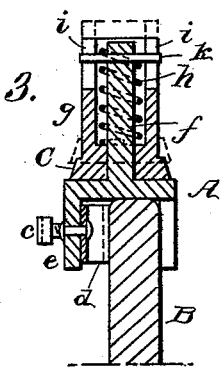

Figure 1 represents a longitudinal elevation of a rein holder embodying my invention and as applied to the dash-board of a vehicle shown only in part. Fig. 2 is a longitudinal horizontal section through the dash-board, upon the line 2—2 in Fig. 1, looking in direction of the arrow $x$; and Fig. 3 a transverse section upon the line 3—3 in Fig. 1.

A, indicates the lower clamping bar or frame of the rein holder, having downwardly-projecting lips or ears $b\ b$, on each side at its opposite ends to receive the upper edge of the dash-board B, between them and to provide for clamping the rein-holder to and on the dash-board by set scews $c\ c$, passing through two of the end lips or ears $b\ b$ and bearing on or against a flat spring $d$, which presses against the dash-board and holds the rein-holder with a spring pressure thereto. Said spring $d$ also serves to protect the dash-board from being defaced or injured by the set screws $c\ c$, and in connection with the set screws provides not only for securely holding the rein-holder in place but also for its ready removal when required, and to accommodate different thicknesses of dash-boards within the bar or frame A, to which latter, or an ear $e$ thereon, said spring $d$ is fastened intermediately of its length.

C, is the yielding or upper presser bar between which and the lower bar or frame A the reins are held with a spring pressure. Thus said presser bar is held to its place by an upwardly-projecting holding pin $f$, integral with or otherwise secured to the lower bar or frame centrally of its length, and passing up through the upper yielding presser bar C and into a socket $g$, mounted on the bar C and containing a spiral spring $h$, arranged around the holding pin $f$, said spring resting on the bottom of the socket $g$ and being secured above by a locking pin $k$, passing through the holding pin $f$ and entering opposite vertical guide slots $i\ i$, in the upper portion of the socket. This construction not only provides for holding the presser bar C in place with a spring pressure on the reins as they, that is the right-hand rein from the one side and the left-hand rein from the opposite side, are slid or introduced between the opposite flaring or rounded ends of the bars A and C, but the arrangement of the socket-holding pin and spiral spring is such as to secure an even pressure on both the right and left-hand reins, so that in driving at night said reins can be fastened by and released from the rein-holder again without danger of getting them crossed. The spiral spring $h$ too is less liable to be broken by frost than is a spanning spring arranged to press at its opposite ends on the presser bar near its opposite ends, and is moreover largely under cover by the socket, to protect it.

Having thus described my invention, I claim as new and desire to secure by Letters Patent—

1. In a rein-holder of the character described, the lower clamping bar of frame provided intermediately of its length with an upwardly-projecting pin adapted to hold an upper presser bar in place, in combination with the upper yielding presser bar having a socket mounted on it, up into and within which the upwardly-projecting pin of the lower clamping bar projects, and a spiral spring arranged within the socket around said upwardly-projecting pin and operating to keep the presser bar down, substantially as specified.

2. In a rein-holder of the character described, the combination of the lower clamping bar or frame A, having an upwardly projecting central pin f, and the upper yielding presser bar C, having mounted on it the socket g, adapted to be guided up and down in common with the upper presser bar, and the spiral spring h, within the socket, operating to keep the presser bar down, essentially as shown and described.

HOMER C. DAVIS.

Witnesses:
SAMUEL PORTER,
JOHN KURTZ.